US012750424B2

(12) United States Patent
Tan et al.

(10) Patent No.: US 12,750,424 B2
(45) Date of Patent: Sep. 29, 2026

(54) REMOTE DIAGNOSTICS BETWEEN VEHICLES AND VIA EFFICIENT UDT COMMUNICATION WITH A REMOTE SERVER

(71) Applicant: THINKCAR SOFTWARE TECHNOLOGY DEVELOPMENT CO., LTD., Shenzhen (CN)

(72) Inventors: Bin Tan, Shenzhen (CN); Yunfei Liu, Shenzhen (CN); Jiafeng Xie, Shenzhen (CN)

(73) Assignee: THINKCAR SOFTWARE TECHNOLOGY DEVELOPMENT CO., LTD., Shenzhen (CN)

( * ) Notice: Subject to any disclaimer, the term of this patent is extended or adjusted under 35 U.S.C. 154(b) by 70 days.

(21) Appl. No.: 18/998,153

(22) PCT Filed: Apr. 27, 2023

(86) PCT No.: PCT/CN2023/091365
§ 371 (c)(1),
(2) Date: Jan. 24, 2025

(87) PCT Pub. No.: WO2024/027242
PCT Pub. Date: Feb. 8, 2024

(65) Prior Publication Data

US 2026/0045122 A1 Feb. 12, 2026

(30) Foreign Application Priority Data

Aug. 4, 2022 (CN) ......................... 202210929732.3

(51) Int. Cl.
*H04L 67/12* (2022.01)
*G07C 5/00* (2006.01)
(Continued)

(52) U.S. Cl.
CPC .............. *H04L 67/12* (2013.01); *G07C 5/008* (2013.01); *G07C 5/0808* (2013.01);
(Continued)

(58) Field of Classification Search
CPC ..... G07C 5/008; G07C 5/0808; H04L 1/0002; H04L 67/025; H04L 67/12; H04L 69/164; H04W 4/44
See application file for complete search history.

(56) References Cited

U.S. PATENT DOCUMENTS 7,212,893 B2 * 5/2007 Doherty ................. G07C 5/008 701/31.5
8,955,033 B2 * 2/2015 Khemani ................ H04L 67/51 726/1
(Continued)

FOREIGN PATENT DOCUMENTS

EP 3422128 A1 * 1/2019 ........... G07C 5/0858
KR 1020190008170 * 1/2019 ............ G07C 5/008

OTHER PUBLICATIONS

Wang, Xin, "International Search Report", Jul. 20, 2023, PCT/CN2023/091365 (Year: 2023).*
(Continued)

*Primary Examiner* — Ramy M Osman

(57) ABSTRACT

Disclosed are a data transmission system, method, and apparatus, a device, and a medium, used for solving the problem in the prior art of low data transmission efficiency in a remote vehicle diagnostic process. Specifically, a vehicle diagnostic device establishes a UDT communication connection with a remote diagnostic server, and during a data transmission process, the vehicle diagnostic device periodically determines a current congestion value on the basis of a transmission delay between the vehicle diagnostic device and the remote diagnostic server, a network state of the vehicle diagnostic device, and the load capacity of the
(Continued)

remote diagnostic server, and according to a target transmission rate corresponding to the current congestion value, sends a UDT data packet encapsulated by data to be transmitted of a target vehicle.

10 Claims, 4 Drawing Sheets

(51) Int. Cl.

| | |
|---|---|
| ***G07C 5/08*** | (2006.01) |
| ***H04L 1/00*** | (2006.01) |
| ***H04L 67/025*** | (2022.01) |
| ***H04L 69/164*** | (2022.01) |
| ***H04W 4/44*** | (2018.01) |

(52) U.S. Cl.

CPC .......... *H04L 1/0002* (2013.01); *H04L 67/025* (2013.01); *H04L 69/164* (2013.01); *H04W 4/44* (2018.02)

(56) References Cited

U.S. PATENT DOCUMENTS

| | | | | |
|---|---|---|---|---|
| 8,996,614 | B2 * | 3/2015 | Choudhary | H04L 65/611 718/105 |
| 9,448,969 | B2 * | 9/2016 | Schumacher | G06F 17/00 |
| 10,665,040 | B2 * | 5/2020 | Colvin | G07C 5/085 |
| 11,417,155 | B2 * | 8/2022 | Rocci | G07C 5/0808 |
| 2007/0115848 | A1 * | 5/2007 | Chean | H04L 47/12 370/252 |
| 2008/0167758 | A1 * | 7/2008 | Louch | H04L 12/66 701/2 |
| 2011/0069616 | A1 * | 3/2011 | Revels | H04L 47/196 370/236 |
| 2016/0344608 | A1 * | 11/2016 | Siemens | H04L 43/12 |
| 2018/0270150 | A1 * | 9/2018 | Gholmieh | H04L 69/22 |
| 2020/0394853 | A1 * | 12/2020 | Jung | H04L 12/66 |
| 2021/0014309 | A1 * | 1/2021 | Kim | G07C 5/008 |
| 2021/0014318 | A1 * | 1/2021 | Xiao | G07C 5/008 |
| 2021/0065474 | A1 * | 3/2021 | Liu | G07C 5/0808 |
| 2021/0112002 | A1 * | 4/2021 | Pan | H04L 45/74 |
| 2021/0218830 | A1 * | 7/2021 | Liu | G07C 5/0808 |
| 2021/0327163 | A1 * | 10/2021 | Brunda | G07C 5/008 |
| 2023/0009246 | A1 * | 1/2023 | Tan | G05B 23/0213 |
| 2023/0058631 | A1 * | 2/2023 | Tan | H04L 65/1069 |
| 2023/0066488 | A1 * | 3/2023 | Tan | G07C 5/008 |
| 2023/0343146 | A1 * | 10/2023 | Jung | G07C 5/008 |
| 2024/0031842 | A1 * | 1/2024 | Zhang | H04W 24/08 |
| 2024/0212399 | A1 * | 6/2024 | Chen | G07C 5/008 |
| 2025/0078581 | A1 * | 3/2025 | Alastair-Hunter | G07C 5/008 |
| 2025/0212052 | A1 * | 6/2025 | Gupta | H04L 47/193 |
| 2026/0045122 | A1 * | 2/2026 | Tan | G07C 5/008 |
| 2026/0067364 | A1 * | 3/2026 | Lee | H04L 67/12 |

OTHER PUBLICATIONS

Marisa, Lazaro, "Supplementary European Search Report", Sep. 11, 2025, EP23848953 (Year: 2025).*

Marisa, Lazaro, "EPO Form 2906 01.91TRI", Sep. 11, 2025, EP23848953 (Year: 2025).*

Wang, Xin, "International Preliminary Report on Patentability", Feb. 4, 2025, PCT/CN2023/091365 (Year: 2023).*

* cited by examiner

REMOTE DIAGNOSTICS BETWEEN VEHICLES AND VIA EFFICIENT UDT COMMUNICATION WITH A REMOTE SERVER

CROSS-REFERENCE TO RELATED APPLICATION

The present disclosure claims the priority to the Chinese patent application with the filling No. 202210929732.3 filed with the Chinese Patent Office on Aug. 4, 2022, and entitled "DATA TRANSMISSION SYSTEM, METHOD, APPARATUS, DEVICE, AND MEDIUM", the contents of which are incorporated herein by reference in entirety.

TECHNICAL FIELD

The present disclosure relates to the technical field of wireless communications, and particularly to a data transmission system, a method, an apparatus, a device, and a medium.

BACKGROUND ART

At present, during the vehicle remote diagnostic process, the vehicle diagnostic device usually needs to continuously perform data transmission with the remote diagnostic server. Therefore, a long connection needs to be maintained between the vehicle diagnostic device and the remote diagnostic server. Traditional data transmission systems based on vehicle remote diagnostic typically adopt transmission control protocol (TCP) to maintain the long connection between the vehicle diagnostic device and the remote diagnostic server.

In practical applications, the distance between the vehicle diagnostic device and the remote diagnostic server is relatively long. Typically, TCP performs poorly in long-distance data transmission, which leads to low transmission efficiency and severe packet loss during data transmission between the vehicle diagnostic device and the remote diagnostic server, thereby affecting the data transmission performance of data transmission systems based on vehicle remote diagnostic.

SUMMARY

The embodiments of the present disclosure disclose a data transmission system, a method, an apparatus, a device, and a medium, which are used for solving the problem in the prior art of low data transmission efficiency and severe packet loss in a remote vehicle diagnostic process.

The technical solution provided by the embodiment of the present disclosure is as follows.

In a first aspect, the embodiment of the present disclosure provides a data transmission system, including: a first vehicle diagnostic device, a second vehicle diagnostic device, and a remote diagnostic server, wherein the first vehicle diagnostic device and the second vehicle diagnostic device respectively establish communication connections with the remote diagnostic server through a user datagram protocol (UDP)-based data transfer protocol (UDT).

The first vehicle diagnostic device is configured for collecting vehicle monitoring data of a target vehicle; encapsulating the vehicle monitoring data of the target vehicle into a first UDT data packet; sending the first UDT data packet at a first target transmission rate corresponding to a first current congestion value, wherein the first current congestion value is determined based on a first current transmission delay between the first vehicle diagnostic device and the remote diagnostic server, a first current network state of the first vehicle diagnostic device, and a first current load capacity of the remote diagnostic server; and receiving a second UDT data packet returned by the second vehicle diagnostic device based on the first UDT data packet, which is forwarded by the remote diagnostic server; and performing a vehicle maintenance operation on the target vehicle based on a vehicle diagnostic result of the target vehicle in the second UDT data packet and a vehicle maintenance plan corresponding to the vehicle diagnostic result.

The remote diagnostic server is configured for receiving the first UDT data packet sent by the first vehicle diagnostic device and forwarding it to the second vehicle diagnostic device; and receiving the second UDT data packet returned by the second vehicle diagnostic device and forwarding it to the first vehicle diagnostic device.

The second vehicle diagnostic device is configured for receiving the first UDT data packet forwarded by the remote diagnostic server; determining the vehicle diagnostic result of the target vehicle and the vehicle maintenance plan corresponding to the vehicle diagnostic result based on the vehicle monitoring data of the target vehicle in the first UDT data packet; encapsulating the vehicle diagnostic result of the target vehicle and the vehicle maintenance plan corresponding to the vehicle diagnostic result into a second UDT data packet; and sending the second UDT data packet at a second target transmission rate corresponding to a second current congestion value, wherein the second current congestion value is determined based on a second current transmission delay between the second vehicle diagnostic device and the remote diagnostic server, a second current network state of the second vehicle diagnostic device, and a second current load capacity of the remote diagnostic server.

In one possible embodiment, the first vehicle diagnostic device is further configured for obtaining the first current transmission delay, the first current network state, and the first current load capacity; determining a first current transmission delay level corresponding to the first current transmission delay, a first current network state level corresponding to the first current network state, and a first current load capacity level corresponding to the first current load capacity; obtaining a first current transmission delay weight corresponding to the first current transmission delay, a first current network state weight corresponding to the first current network state, and the first current load capacity weight corresponding to the first current load capacity; determining the first current congestion value based on the first current transmission delay level and the first current transmission delay weight, the first current network state level and the first current network state weight, and the first current load capacity level and the first current load capacity weight; and determining the first target transmission rate based on the first current congestion value.

The second vehicle diagnostic device is further configured for obtaining the second current transmission delay, the second current network state, and the second current load capacity; determining a second current transmission delay level corresponding to the second current transmission delay, a second current network state level corresponding to the second current network state, and a second current load capacity level corresponding to the second current load capacity; obtaining a second current transmission delay weight corresponding to the second current transmission delay, a second current network state weight corresponding to the second current network state, and the second current load capacity weight corresponding to the second current load capacity; determining the second current congestion value based on the second current transmission delay level and the second current transmission delay weight, the second current network state level and the second current network state weight, and the second current load capacity level and the second current load capacity weight; and determining the second target transmission rate based on the second current congestion value.

In one possible embodiment, the first vehicle diagnostic device is specifically configured for sending a first delay detection data packet to the remote diagnostic server; receiving a first delay response data packet returned by the remote diagnostic server based on the first delay detection data packet; determining the first current transmission delay based on a difference between a sending time of the first delay detection data packet and a receiving time of the first delay response data packet; determining a current network of the first vehicle diagnostic device as the first current network state; and determining a current concurrency value of the remote diagnostic server in the first delay response data packet as the first current load capacity.

The second vehicle diagnostic device is specifically configured for sending a second delay detection data packet to the remote diagnostic server; receiving a second delay response data packet returned by the remote diagnostic server based on the second delay detection data packet; determining the second current transmission delay based on a difference between a sending time of the second delay detection data packet and a receiving time of the second delay response data packet; determining a current network of the second vehicle diagnostic device as the second current network state; and determining a current concurrency value of the remote diagnostic server in the second delay response data packet as the second current load capacity.

In one possible embodiment, the first vehicle diagnostic device is specifically configured for obtaining a first current position distance between the first vehicle diagnostic device and the remote diagnostic server; determining the transmission delay weight corresponding to the first current position distance as the first current transmission delay weight based on a corresponding relationship between a position distance and the transmission delay weight; and dividing a remaining weight after removing the first current transmission delay weight based on a weight ratio between the first current network state and the first current load capacity to obtain the first current network state weight and the first current load capacity weight.

The second vehicle diagnostic device is specifically configured for obtaining a second current position distance between the second vehicle diagnostic device and the remote diagnostic server; determining the transmission delay weight corresponding to the second current position distance as the second current transmission delay weight based on a corresponding relationship between a position distance and the transmission delay weight; and dividing a remaining weight after removing the second current transmission delay weight based on a weight ratio between the second current network state and the second current load capacity to obtain the second current network state weight and the second current load capacity weight.

In one possible embodiment, the first vehicle diagnostic device is further configured for dynamically adjusting the first current transmission delay weight, the first current network state weight, and the first current load capacity weight based on the changed first current network state when the first current network state changes; and/or dynamically adjusting the first current transmission delay weight, the first current network state weight, and the first current load capacity weight based on the changed first current position distance when the first current position distance changes.

The second vehicle diagnostic device is further configured for dynamically adjusting the second current transmission delay weight, the second current network state weight, and the second current load capacity weight based on the changed second current network state when the second current network state changes; and/or dynamically adjusting the second current transmission delay weight, the second current network state weight, and the second current load capacity weight based on the changed second current position distance when the second current position distance changes.

In one possible embodiment, the first vehicle diagnostic device is specifically configured for encrypting the vehicle monitoring data of the target vehicle based on the advanced encryption standard (AES) encryption algorithm to obtain a first encrypted data, and encapsulating the first encrypted data into the first UDT data packet; and the second vehicle diagnostic device is specifically configured for encrypting the vehicle diagnostic result of the target vehicle and the vehicle maintenance plan corresponding to the vehicle diagnostic result based on the AES encryption algorithm to obtain a second encrypted data and encapsulating the second encrypted data into the second UDT data packet.

In another aspect, the embodiment of the present disclosure provides a data transmission method, which is applied to a vehicle diagnostic device, wherein the vehicle diagnostic device establishes a communication connection with a remote diagnostic server through UDT, and the data transmission method includes:

obtaining data to be transmitted of the target vehicle, wherein the data to be transmitted comprises the vehicle monitoring data of the target vehicle or the vehicle diagnostic result of the target vehicle and the vehicle maintenance plan corresponding to the vehicle diagnostic result;

encapsulating the data to be transmitted of the target vehicle into a UDT data packet; and sending the UDT data packet at a target transmission rate corresponding to a current congestion value, wherein the current congestion value is determined based on a current transmission delay between the vehicle diagnostic device and the remote diagnostic server, a current network state of the vehicle diagnostic device, and a current load capacity of the remote diagnostic server.

In one possible embodiment, the data transmission method provided by the embodiment of the present disclosure further includes:

obtaining the current transmission delay, the current network state, and the current load capacity; determining a current transmission delay level corresponding to the current transmission delay, a current network state level corresponding to the current network state, and a current load capacity level corresponding to the current load capacity;

obtaining a current transmission delay weight corresponding to the current transmission delay, a current network state weight corresponding to the current network state, and the current load capacity weight corresponding to the current load capacity;

determining the current congestion value based on the current transmission delay level and the current transmission delay weight, the current network state level and the current network state weight, and the current load capacity level and the current load capacity weight; and determining the target transmission rate based on the current congestion value.

In one possible embodiment, the step of obtaining the current transmission delay, the current network state, and the current load capacity includes:

sending a delay detection data packet to the remote diagnostic server; receiving a delay response data packet returned by the remote diagnostic server based on the delay detection data packet; determining the current transmission delay based on a difference between a sending time of the delay detection data packet and a receiving time of the delay response data packet;

determining a current network of the vehicle diagnostic device as the current network state; and determining a current concurrency value of the remote diagnostic server in the delay response data packet as the current load capacity.

In one possible embodiment, the step of obtaining a current transmission delay weight corresponding to the current transmission delay, a current network state weight corresponding to the current network state, and the current load capacity weight corresponding to the current load capacity includes:

obtaining a current position distance between the vehicle diagnostic device and the remote diagnostic server; determining the transmission delay weight corresponding to the current position distance as the current transmission delay weight based on a corresponding relationship between a position distance and the transmission delay weight; and dividing a remaining weight after removing the current transmission delay weight based on a weight ratio between the current network state and the current load capacity to obtain the current network state weight and the current load capacity weight.

In one possible embodiment, the data transmission method provided by the embodiment of the present disclosure further includes:

dynamically adjusting the current transmission delay weight, the current network state weight, and the current load capacity weight based on the changed current network state when the current network state changes; and/or dynamically adjusting the current transmission delay weight, the current network state weight, and the current load capacity weight based on the changed current position distance when the current position distance changes.

In one possible embodiment, the step of encapsulating the data to be transmitted of the target vehicle into a UDT data packet includes:

encrypting the data to be transmitted of the target vehicle based on the AES encryption algorithm to obtain encrypted data and encapsulating the encrypted data into the UDT data packet.

In another aspect, the embodiment of the present disclosure provides a data transmission apparatus, which is applied to a vehicle diagnostic device, wherein the vehicle diagnostic device establishes a communication connection with a remote diagnostic server through UDT, and the data transmission apparatus includes:

a data acquisition unit, configured for obtaining data to be transmitted of the target vehicle, wherein the data to be transmitted comprises the vehicle monitoring data of the target vehicle or the vehicle diagnostic result of the target vehicle and the vehicle maintenance plan corresponding to the vehicle diagnostic result;

a data transmission unit, configured for encapsulating the data to be transmitted of the target vehicle into a UDT data packet; and sending the UDT data packet at a target transmission rate corresponding to a current congestion value, wherein the current congestion value is determined based on a current transmission delay between the vehicle diagnostic device and the remote diagnostic server, a current network state of the vehicle diagnostic device, and a current load capacity of the remote diagnostic server.

In one possible embodiment, the data transmission apparatus provided by the embodiment of the present disclosure further includes:

a rate determination unit, configured for obtaining the current transmission delay, the current network state, and the current load capacity; determining a current transmission delay level corresponding to the current transmission delay, a current network state level corresponding to the current network state, and a current load capacity level corresponding to the current load capacity; obtaining a current transmission delay weight corresponding to the current transmission delay, a current network state weight corresponding to the current network state, and the current load capacity weight corresponding to the current load capacity; determining the current congestion value based on the current transmission delay level and the current transmission delay weight, the current network state level and the current network state weight, and the current load capacity level and the current load capacity weight; and determining the target transmission rate based on the current congestion value.

In one possible embodiment, when obtaining the current transmission delay, the current network state, and the current load capacity, the rate determination unit is specifically configured for:

sending a delay detection data packet to the remote diagnostic server; receiving a delay response data packet returned by the remote diagnostic server based on the delay detection data packet; determining the current transmission delay based on a difference between a sending time of the delay detection data packet and a receiving time of the delay response data packet;

determining a current network of the vehicle diagnostic device as the current network state; and determining a current concurrency value of the remote diagnostic server in the delay response data packet as the current load capacity.

In one possible embodiment, when obtaining a current transmission delay weight corresponding to the current transmission delay, a current network state weight corresponding to the current network state, and the current load capacity weight corresponding to the current load capacity, the rate determination unit is specifically configured for:

obtaining a current position distance between the vehicle diagnostic device and the remote diagnostic server; determining the transmission delay weight corresponding to the current position distance as the current transmission delay weight based on a corresponding relationship between a position distance and the transmission delay weight; and dividing a remaining weight after removing the current transmission delay weight based on a weight ratio between the current network state and the current load capacity to obtain the current network state weight and the current load capacity weight.

In one possible embodiment, the data transmission apparatus provided by the embodiment of the present disclosure further includes:

a dynamic adjustment unit, configured for dynamically adjusting the current transmission delay weight, the current network state weight, and the current load capacity weight based on the changed current network state when the current network state changes; and/or dynamically adjusting the current transmission delay weight, the current network state weight, and the current load capacity weight based on the changed current position distance when the current position distance changes.

In one possible embodiment, when encapsulating the data to be transmitted of the target vehicle into a UDT data packet, the data transmission unit is specifically configured for:

encrypting the data to be transmitted of the target vehicle based on the AES encryption algorithm to obtain encrypted data and encapsulating the encrypted data into the UDT data packet.

In another aspect, the embodiments of the present disclosure provide a vehicle diagnostic device including a memory, a processor, and a computer program stored on the memory and executable on the processor. The processor, when executing the computer program, implements the data transmission method provided by the embodiment of the present disclosure.

In yet another aspect, the embodiments of the present disclosure also provide a computer-readable storage medium, wherein the computer-readable storage medium contains computer programs. The computer instructions, when executed by a processor, implement the data transmission method provided by the embodiment of the present disclosure.

The beneficial effects of the embodiments of the present disclosure are as follows.

In the embodiment of the present disclosure, UDT is used as the data transfer protocol between the vehicle diagnostic device and the remote diagnostic server. Additionally, a data transmission rate can be controlled by means of utilizing, on the UDT, three dimensions, comprising the transmission delay, the network state, and the load capacity, which can ensure the accuracy and continuity of data transmission while ensuring data transmission efficiency, thereby effectively relieving the packet loss phenomenon. In turn, the data transmission performance of the data transmission system can be improved.

Other features and advantages of the present disclosure will be set forth in the subsequent specification and, in part, become apparent from the specification or are understood by implementing the present disclosure. The objectives and other advantages of the present disclosure can be realized and obtained through the structures particularly specified in the written description, claims, and drawings.

BRIEF DESCRIPTION OF DRAWINGS

The drawings depicted herein are provided to offer a further understanding of the present disclosure and constitute a part of the present disclosure. The illustrative embodiments and their descriptions serve to explain the present disclosure and do not constitute undue limitations on the present disclosure. In the drawings.

DETAILED DESCRIPTION OF EMBODIMENTS

Figure 1:
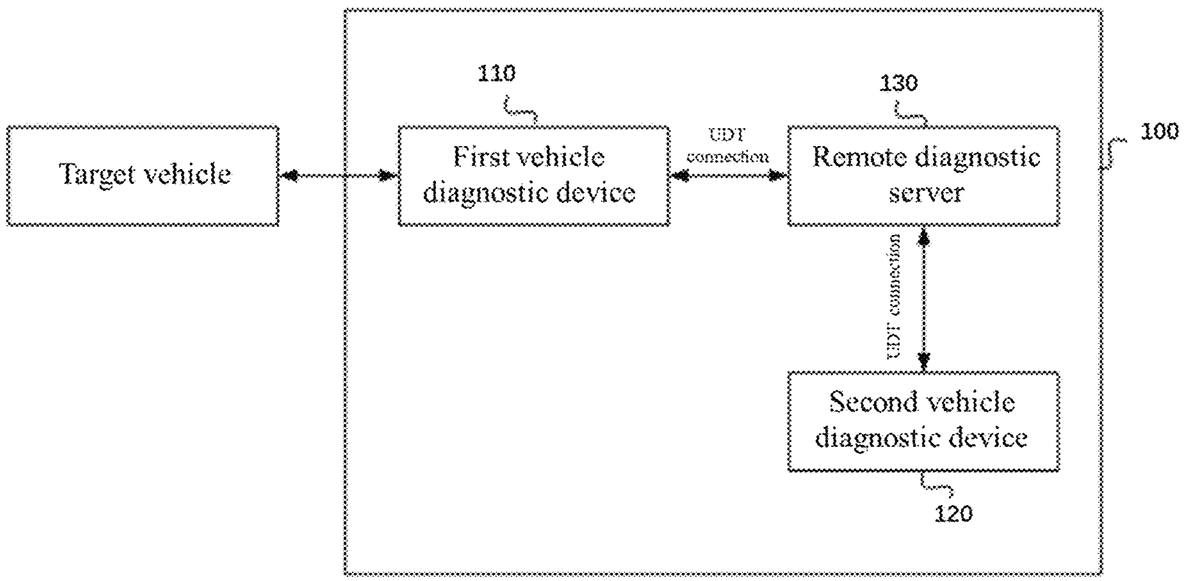
FIG. 1 is a schematic diagram of a system architecture of a data transmission system in an embodiment of the present disclosure.

To make the objectives, technical solutions, and beneficial effects of the present disclosure clearer and more comprehensible, the technical solutions in the embodiments of the present disclosure will be clearly and completely described below in conjunction with the drawings. Evidently, the described embodiments are merely part of the embodiments of the present disclosure, not all embodiments. Based on the embodiments in the present disclosure, all other embodiments obtained by those of ordinary skill in the art without making inventive efforts are within the scope of protection of the present disclosure.

For the convenience of better understanding by those skilled in the art, technical terms involved in the present disclosure are briefly introduced below.

The vehicle diagnostic device is an electronic device configured for fault diagnostic of vehicles. In the embodiments of the present disclosure, the vehicle diagnostic device includes a first vehicle diagnostic device and a vehicle diagnostic device, wherein the first vehicle diagnostic device is a front-end vehicle diagnostic device connected to the target vehicle for collecting vehicle monitoring data such as the vehicle identification number, current mileage, and current transmitter speed of the target vehicle; and the second vehicle diagnostic device is a back-end vehicle diagnostic device configured for diagnosing faults in the target vehicle based on the vehicle monitoring data of the target vehicle.

The remote diagnostic server is a back-end server configured to forward data between the first vehicle diagnostic device and the second vehicle diagnostic device.

It should be noted that the terms "first", "second", and the like mentioned in the present disclosure are used to distinguish similar objects and are not necessarily intended to describe a specific sequence or order. It should be understood that such terms can be used interchangeably where appropriate, so that the embodiments described herein can be implemented in orders other than those illustrated or described. Additionally, the term "and/or" in the present disclosure describes a relationship between associated objects, indicating three possible relationships. For example, "A and/or B" may indicate: the presence of A, the presence of both A and B, or the presence of B. The character "/" generally represents an "or" relationship between the preceding and following associated objects.

After introducing the technical terms related to the present disclosure, the application scenarios and design concepts of the embodiments of the present disclosure are briefly introduced below.

Currently, data transmission systems based on vehicle remote diagnostic mainly include a first vehicle diagnostic device, a second vehicle diagnostic device, and a remote diagnostic server. Both the first vehicle diagnostic device and the second vehicle diagnostic device use TCP to maintain long connections with the remote diagnostic server. However, the performance of TCP in long-distance data transmission is usually poor, resulting in low transmission efficiency and severe packet loss in the data transmission system, which negatively impacts the data transmission performance of the data transmission system.

To address this issue, in the embodiments of the present disclosure, UDT is used as the data transfer protocol for the first vehicle diagnostic device to communicate with the remote diagnostic server and for the second vehicle diagnostic device to communicate with the remote diagnostic server. Moreover, during the data transmission process between the first vehicle diagnostic device and the remote diagnostic server, and between the second vehicle diagnostic device and the remote diagnostic server, the data transmission rate is periodically controlled based on three dimensions: current transmission delay, current network state, and current load capacity. Therefore, a data transmission rate can be controlled by means of utilizing, on the UDT, three dimensions, comprising the transmission delay, the network state, and the load capacity, which can ensure the accuracy and continuity of data transmission while ensuring data transmission efficiency, thereby effectively relieving the packet loss phenomenon. Thus, data transmission performance can be improved.

After introducing the application scenarios and design concepts of the embodiments of the present disclosure, the technical solutions provided by the embodiments of the present disclosure will be described in detail below.

The embodiment of the present disclosure provides a data transmission system. Referring to FIG. 1, the data transmission system 100 provided in the embodiment of the present disclosure at least includes: a first vehicle diagnostic device 110, a second vehicle diagnostic device 120, and a remote diagnostic server 130, wherein the first vehicle diagnostic device 110 and the second vehicle diagnostic device 120 respectively establish communication connections with the remote diagnostic server 130 through the UDT.

The first vehicle diagnostic device 110 is configured for collecting vehicle monitoring data of a target vehicle; encapsulating the vehicle monitoring data of the target vehicle into a first UDT data packet; sending the first UDT data packet at a first target transmission rate corresponding to a first current congestion value, wherein the first current congestion value is determined based on a first current transmission delay between the first vehicle diagnostic device 110 and the remote diagnostic server 130, a first current network state of the first vehicle diagnostic device 110, and a first current load capacity of the remote diagnostic server 130; and receiving a second UDT data packet returned by the second vehicle diagnostic device 120 based on the first UDT data packet, which is forwarded by the remote diagnostic server 130; and performing a vehicle maintenance operation on the target vehicle based on a vehicle diagnostic result of the target vehicle in the second UDT data packet and a vehicle maintenance plan corresponding to the vehicle diagnostic result.

The remote diagnostic server 130 is configured for receiving the first UDT data packet sent by the first vehicle diagnostic device 110 and forwarding it to the second vehicle diagnostic device 120; and receiving the second UDT data packet returned by the second vehicle diagnostic device 120 and forwarding it to the first vehicle diagnostic device 110.

The second vehicle diagnostic device 120 is configured for receiving the first UDT data packet forwarded by the remote diagnostic server 130; determining the vehicle diagnostic result of the target vehicle and the vehicle maintenance plan corresponding to the vehicle diagnostic result based on the vehicle monitoring data of the target vehicle in the first UDT data packet; encapsulating the vehicle diagnostic result of the target vehicle and the vehicle maintenance plan corresponding to the vehicle diagnostic result into a second UDT data packet; and sending the second UDT data packet at a second target transmission rate corresponding to a second current congestion value, wherein the second current congestion value is determined based on a second current transmission delay between the second vehicle diagnostic device 120 and the remote diagnostic server 130, a second current network state of the second vehicle diagnostic device 120, and a second current load capacity of the remote diagnostic server 130.

In one possible embodiment, the first vehicle diagnostic device 110 is further configured for obtaining the first current transmission delay, the first current network state, and the first current load capacity; determining a first current transmission delay level corresponding to the first current transmission delay, a first current network state level corresponding to the first current network state, and a first current load capacity level corresponding to the first current load capacity; obtaining a first current transmission delay weight corresponding to the first current transmission delay, a first current network state weight corresponding to the first current network state, and the first current load capacity weight corresponding to the first current load capacity; determining the first current congestion value based on the first current transmission delay level and the first current transmission delay weight, the first current network state level and the first current network state weight, and the first current load capacity level and the first current load capacity weight; and determining the first target transmission rate based on the first current congestion value.

The second vehicle diagnostic device 120 is further configured for obtaining the second current transmission delay, the second current network state, and the second current load capacity; determining a second current transmission delay level corresponding to the second current transmission delay, a second current network state level corresponding to the second current network state, and a second current load capacity level corresponding to the second current load capacity; obtaining a second current transmission delay weight corresponding to the second current transmission delay, a second current network state weight corresponding to the second current network state, and the second current load capacity weight corresponding to the second current load capacity; determining the second current congestion value based on the second current transmission delay level and the second current transmission delay weight, the second current network state level and the second current network state weight, and the second current load capacity level and the second current load capacity weight; and determining the second target transmission rate based on the second current congestion value.

In one possible embodiment, the first vehicle diagnostic device 110 is specifically configured for sending a first delay detection data packet to the remote diagnostic server 130; receiving a first delay response data packet returned by the remote diagnostic server 130 based on the first delay detection data packet; determining the first current transmission delay based on a difference between a sending time of the first delay detection data packet and a receiving time of the first delay response data packet; determining a current network of the first vehicle diagnostic device 110 as the first current network state; and determining a current concurrency value of the remote diagnostic server 130 in the first delay response data packet as the first current load capacity.

The second vehicle diagnostic device 120 is specifically configured for sending a second delay detection data packet to the remote diagnostic server 130; receiving a second delay response data packet returned by the remote diagnostic server 130 based on the second delay detection data packet; determining the second current transmission delay based on a difference between a sending time of the second delay detection data packet and a receiving time of the second delay response data packet; determining a current network of the second vehicle diagnostic device 120 as the second current network state; and determining a current concurrency value of the remote diagnostic server 130 in the second delay response data packet as the second current load capacity.

In one possible embodiment, the first vehicle diagnostic device 110 is specifically configured for obtaining a first current position distance between the first vehicle diagnostic device 110 and the remote diagnostic server 130; determining the transmission delay weight corresponding to the first current position distance as the first current transmission delay weight based on a corresponding relationship between a position distance and the transmission delay weight; and dividing a remaining weight after removing the first current transmission delay weight based on a weight ratio between the first current network state and the first current load capacity to obtain the first current network state weight and the first current load capacity weight.

The second vehicle diagnostic device 120 is specifically configured for obtaining a second current position distance between the second vehicle diagnostic device 120 and the remote diagnostic server 130; determining the transmission delay weight corresponding to the second current position distance as the second current transmission delay weight based on a corresponding relationship between a position distance and the transmission delay weight; and dividing a remaining weight after removing the second current transmission delay weight based on a weight ratio between the second current network state and the second current load capacity to obtain the second current network state weight and the second current load capacity weight.

In one possible embodiment, the first vehicle diagnostic device 110 is further configured for dynamically adjusting the first current transmission delay weight, the first current network state weight, and the first current load capacity weight based on the changed first current network state when the first current network state changes; and/or dynamically adjusting the first current transmission delay weight, the first current network state weight, and the first current load capacity weight based on the changed first current position distance when the first current position distance changes.

The second vehicle diagnostic device 120 is further configured for dynamically adjusting the second current transmission delay weight, the second current network state weight, and the second current load capacity weight based on the changed second current network state when the second current network state changes; and/or dynamically adjusting the second current transmission delay weight, the second current network state weight, and the second current load capacity weight based on the changed second current position distance when the second current position distance changes.

In one possible embodiment, the first vehicle diagnostic device 110 is specifically configured for obtain a first current maximum receiving rate of the remote diagnostic server 130, and determining a product of the first current congestion value and the first current maximum receiving rate as a first target transmission rate.

The second vehicle diagnostic device 120 is specifically configured for obtaining a second current maximum receiving rate of the remote diagnostic server 130, and determining a product of the second current congestion value and the second current maximum receiving rate as a second target transmission rate.

In one possible embodiment, the first vehicle diagnostic device 110 is specifically configured for encrypting the vehicle monitoring data of the target vehicle based on a first encryption algorithm to obtain a first encrypted data, and encapsulating the first encrypted data into the first UDT data packet.

The second vehicle diagnostic device 120 is specifically configured for encrypting the vehicle diagnostic result of the target vehicle and the vehicle maintenance plan corresponding to the vehicle diagnostic result based on a second encryption algorithm to obtain a second encrypted data and encapsulating the second encrypted data into the second UDT data packet.

In one possible embodiment, the first vehicle diagnostic device 110 is specifically configured for encrypting the vehicle monitoring data of the target vehicle based on the AES encryption algorithm to obtain a first encrypted data.

The second vehicle diagnostic device 120 is specifically configured for encrypting the vehicle diagnostic result of the target vehicle and the vehicle maintenance plan corresponding to the vehicle diagnostic result based on the AES encryption algorithm to obtain a second encrypted data.

Figure 2:
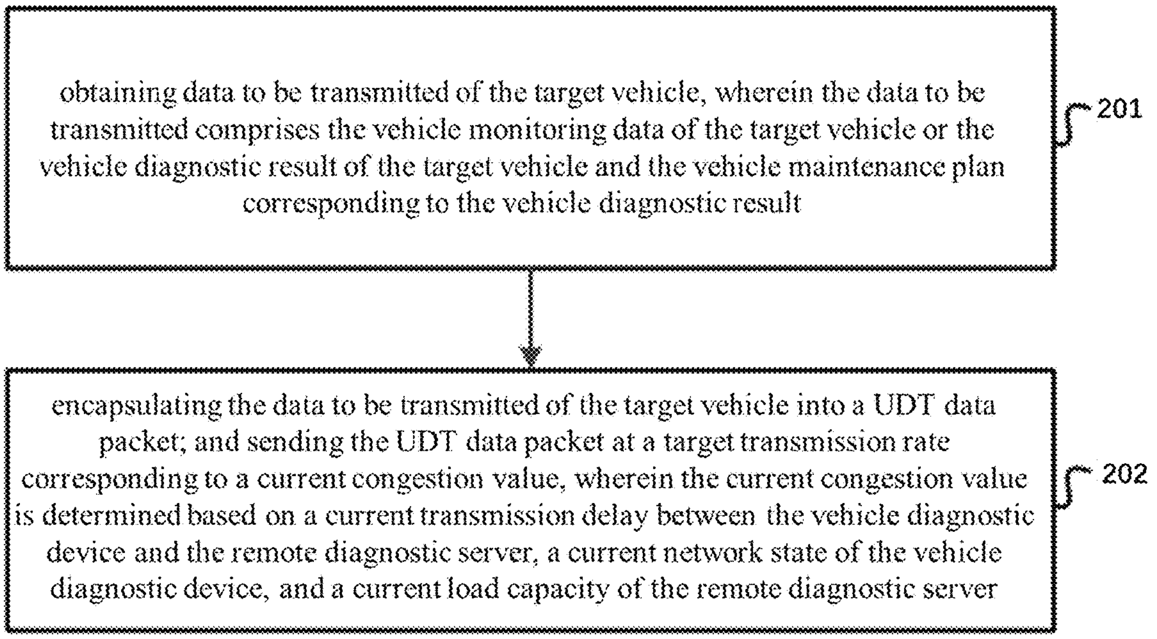
FIG. 2 is a schematic diagram of an overview process of a data transmission method in an embodiment of the present disclosure.

The present disclosure also provides a data transmission method, applied to a vehicle diagnostic device, where the vehicle diagnostic device establishes a communication connection with a remote diagnostic server through UDT. The vehicle diagnostic device can be the first vehicle diagnostic device and the second vehicle diagnostic device in the data transmission system shown in FIG. 1. Specifically, referring to FIG. 2, the overview process of the data transmission method provided in the embodiment of the present disclosure is as follows.

Step 201: obtaining data to be transmitted of the target vehicle, wherein the data to be transmitted comprises the vehicle monitoring data of the target vehicle or the vehicle diagnostic result of the target vehicle and the vehicle maintenance plan corresponding to the vehicle diagnostic result.

In the present disclosure, if the vehicle diagnostic device is the first vehicle diagnostic device, when determining that the remote diagnostic server needs to assist in the diagnostic based on a user operation, the first vehicle diagnostic device can establish a UDT communication connection with the remote diagnostic server. Afterward, data transmission with the remote diagnostic server can be carried out. For example, the first vehicle diagnostic device collects vehicle monitoring data of the target vehicle as data to be transmitted and sends it to the remote diagnostic server. If the vehicle diagnostic device is the second vehicle diagnostic device, when the second vehicle diagnostic device receives a remote diagnostic request initiated by the first vehicle diagnostic device through methods such as phone or text message, it can establish a UDT communication connection with the remote diagnostic server. Afterward, data transmission with the remote diagnostic server can also be carried out. For example, when the second vehicle diagnostic device receives vehicle monitoring data of the target vehicle forwarded by the remote diagnostic server, it determines the vehicle diagnostic result and the vehicle maintenance plan corresponding to the target vehicle based on the vehicle monitoring data of the target vehicle. Then, the vehicle diagnostic result and the vehicle maintenance plan corresponding to the target vehicle are sent as data to be transmitted to the remote diagnostic server.

Step 202: encapsulating the data to be transmitted of the target vehicle into a UDT data packet; and sending the UDT data packet at a target transmission rate corresponding to a current congestion value, wherein the current congestion value is determined based on a current transmission delay between the vehicle diagnostic device and the remote diagnostic server, a current network state of the vehicle diagnostic device, and a current load capacity of the remote diagnostic server.

In the embodiments of the present disclosure, if the vehicle diagnostic device is the first vehicle diagnostic device, the first vehicle diagnostic device can encapsulate the vehicle monitoring data of the target vehicle into the first UDT data packet. Then, according to the first target transmission rate corresponding to the first current congestion value, the first UDT data packet is sent to the remote diagnostic server. This allows the remote diagnostic server to forward the first UDT data packet to the second vehicle diagnostic device, so that the second vehicle diagnostic device can perform remote diagnostic operations on the target vehicle based on the vehicle monitoring data of the target vehicle in the first UDT data packet. If the vehicle diagnostic device is the second vehicle diagnostic device, after receiving the first UDT data packet forwarded by the remote diagnostic server, the second vehicle diagnostic device can obtain the vehicle diagnostic result of the target vehicle and the vehicle maintenance plan corresponding to the vehicle diagnostic result based on the vehicle monitoring data of the target vehicle in the first UDT packet. The vehicle diagnostic result of the target vehicle and the vehicle maintenance plan corresponding to the vehicle diagnostic result is then encapsulated into the second UDT data packet. According to the second target transmission rate corresponding to the second current congestion value, the second UDT data packet is sent to the remote diagnostic server, so that the remote diagnostic server forwards the second UDT data packet to the first vehicle diagnostic device. Afterward, the first vehicle diagnostic device can perform vehicle maintenance operations on the target vehicle based on the vehicle diagnostic result of the target vehicle and the vehicle maintenance plan corresponding to the vehicle diagnostic result in the second UDT packet.

Furthermore, in the embodiments of the present disclosure, in order to improve data security during the data transmission process, the vehicle diagnostic device can encrypt the data to be transmitted of the target vehicle during the data transmission process with the remote diagnostic server. Specifically, the vehicle diagnostic device can encrypt the data to be transmitted of the target vehicle based on a set encryption algorithm to obtain encrypted data. The encrypted data is then encapsulated into the UDT data packet and sent to the remote diagnostic server. In practical applications, the vehicle diagnostic device can encrypt the data to be transmitted of the target vehicle based on the AES encryption algorithm to obtain encrypted data. The encrypted data is then encapsulated into the UDT data packet and sent to the remote diagnostic server. For example, if the vehicle diagnostic device is the first vehicle diagnostic device, the first vehicle diagnostic device can encrypt the vehicle monitoring data of the target vehicle based on the AES encryption algorithm to obtain the first encrypted data. The first encrypted data is then encapsulated into the first UDT data packet, and according to the first target transmission rate corresponding to the first current congestion value, the first UDT data packet is sent to the remote diagnostic server. For another example, if the vehicle diagnostic device is the second vehicle diagnostic device, the second vehicle diagnostic device can encrypt the vehicle diagnostic result of the target vehicle and the vehicle maintenance plan corresponding to the vehicle diagnostic result based on the AES encryption algorithm to obtain the second encrypted data. The second encrypted data is then encapsulated into the second UDT data packet, and according to the second target transmission rate corresponding to the second current congestion value, the second UDT data packet is sent to the remote diagnostic server.

Figure 3:
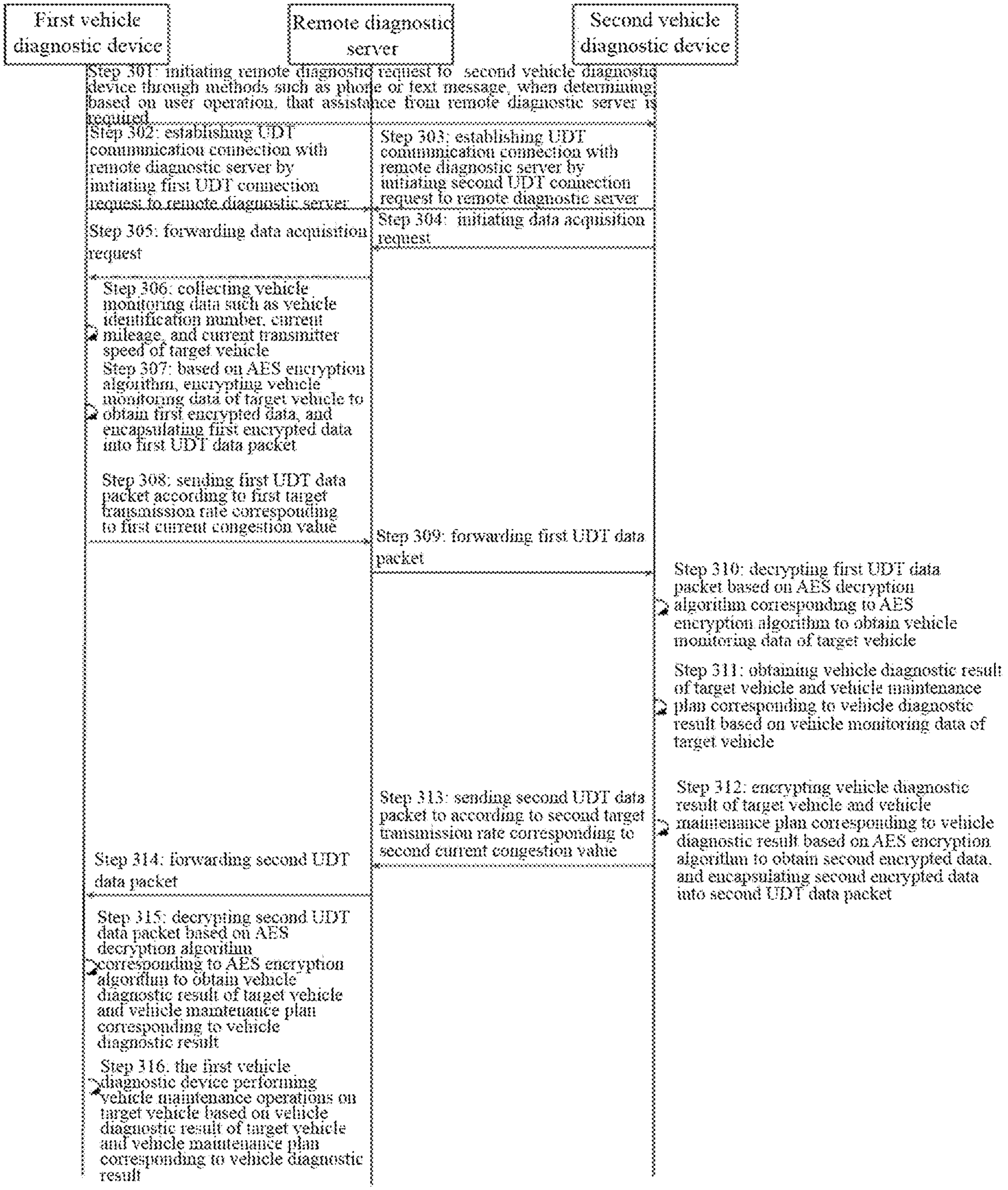
FIG. 3 is a schematic diagram of an interaction process of a data transmission method in an embodiment of the present disclosure.

Below, with reference to the data transmission system shown in FIG. 1, the data transmission method provided by the embodiment of the present disclosure is further explained in detail. Referring to FIG. 3, the interaction process of the data transmission method provided by the embodiment of the present disclosure is as follows.

Step 301: the first vehicle diagnostic device initiating a remote diagnostic request to the second vehicle diagnostic device through methods such as phone or text message, when determining, based on user operation, that assistance from the remote diagnostic server is required.

Step 302: the first vehicle diagnostic device establishing a UDT communication connection with the remote diagnostic server by initiating a first UDT connection request to the remote diagnostic server.

Step 303: the second vehicle diagnostic device, upon receiving the remote diagnostic request initiated by the first vehicle diagnostic device, establishing a UDT communication connection with the remote diagnostic server by initiating a second UDT connection request to the remote diagnostic server.

Step 304: the second vehicle diagnostic device initiating a data acquisition request to the remote diagnostic server.

Step 305: the remote diagnostic server, when receiving the data acquisition request initiated by the second vehicle diagnostic device, forwarding the data acquisition request to the first vehicle diagnostic device.

Step 306: the first vehicle diagnostic device, when receiving the data acquisition request forwarded by the remote diagnostic server, collecting vehicle monitoring data such as the vehicle identification number, current mileage, and current transmitter speed of the target vehicle.

Step 307: the first vehicle diagnostic device, based on the AES encryption algorithm, encrypting the vehicle monitoring data of the target vehicle to obtain the first encrypted data, and encapsulating the first encrypted data into the first UDT data packet.

Step 308: the first vehicle diagnostic device sending the first UDT data packet to the remote diagnostic server according to the first target transmission rate corresponding to the first current congestion value.

Step 309: the remote diagnostic server, when receiving the first UDT data packet sent by the first vehicle diagnostic device, forwarding the first UDT data packet to the second vehicle diagnostic device.

Step 310: the second vehicle diagnostic device, when receiving the first UDT data packet forwarded by the remote diagnostic server, decrypting the first UDT data packet based on the AES decryption algorithm corresponding to the AES encryption algorithm to obtain the vehicle monitoring data of the target vehicle.

Step 311: the second vehicle diagnostic device obtaining the vehicle diagnostic result of the target vehicle and the vehicle maintenance plan corresponding to the vehicle diagnostic result based on the vehicle monitoring data of the target vehicle.

Step 312: the second vehicle diagnostic device encrypting the vehicle diagnostic result of the target vehicle and the vehicle maintenance plan corresponding to the vehicle diagnostic result based on the AES encryption algorithm to obtain a second encrypted data, and encapsulating the second encrypted data into the second UDT data packet.

Step 313: the second vehicle diagnostic device sending the second UDT data packet to the remote diagnostic server according to the second target transmission rate corresponding to the second current congestion value.

Step 314: the remote diagnostic server, when receiving the second UDT data packet sent by the second vehicle diagnostic device, forwarding the second UDT data packet to the first vehicle diagnostic device.

Step 315: the first vehicle diagnostic device, when receiving the second UDT data packet forwarded by the remote diagnostic server, decrypting the second UDT data packet based on the AES decryption algorithm corresponding to the AES encryption algorithm to obtain the vehicle diagnostic result of the target vehicle and the vehicle maintenance plan corresponding to the vehicle diagnostic result.

Step 316: the first vehicle diagnostic device performing vehicle maintenance operations on the target vehicle based on the vehicle diagnostic result of the target vehicle and the vehicle maintenance plan corresponding to the vehicle diagnostic result.

Figure 4:
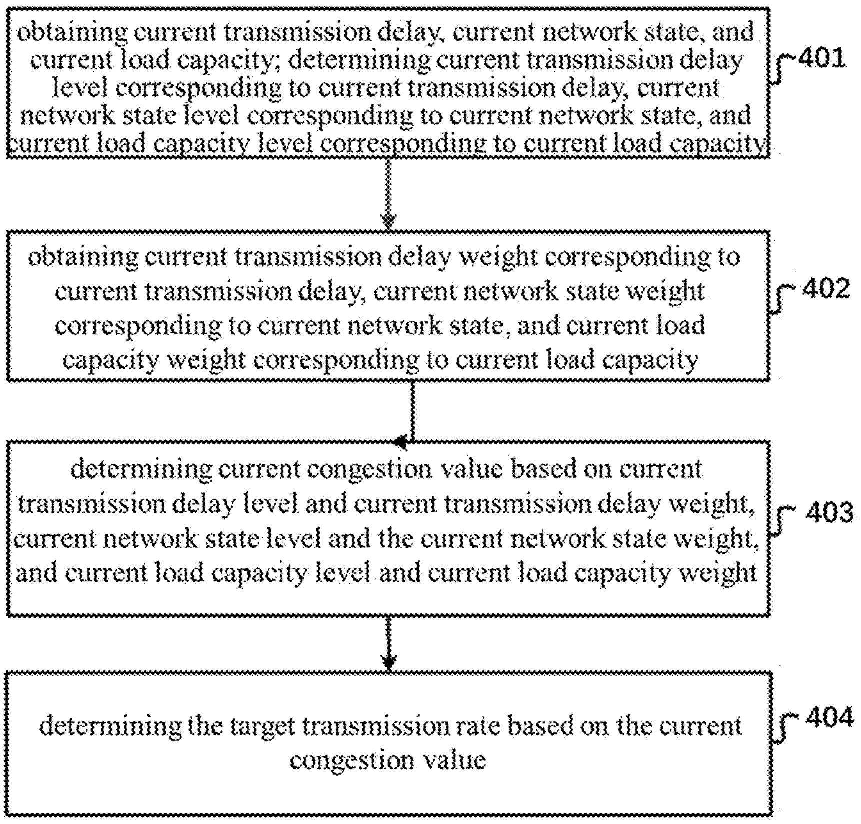
FIG. 4 is a schematic diagram of an overview process of a flow control algorithm in an embodiment of the present disclosure.

It is worth mentioning that, in the embodiment of the present disclosure, during the process of data transmission between the vehicle diagnostic device (where the vehicle diagnostic device can be the first vehicle diagnostic device and the second vehicle diagnostic device in the data transmission system as shown in FIG. 1) and the remote diagnostic server, the data transmission rate can be periodically adjusted based on the current transmission delay, the current network state, and the current load capacity according to a predetermined flow control cycle, thereby achieving periodic flow control during the data transmission process. Specifically, referring to FIG. 4, within each flow control cycle, the flow control algorithm based on the current transmission delay, the current network state, and the current load capacity includes the following steps.

Step 401: obtaining the current transmission delay, the current network state, and the current load capacity; determining a current transmission delay level corresponding to the current transmission delay, a current network state level corresponding to the current network state, and a current load capacity level corresponding to the current load capacity.

In a specific implementation, when the vehicle diagnostic device obtains the current transmission delay, the current network state, and the current load capacity, it can adopt but is not limited to the following methods.

For the current transmission delay, the vehicle diagnostic device can send a delay detection data packet to the remote diagnostic server, receive a delay response data packet returned by the remote diagnostic server based on the delay detection data packet, and determine the current transmission delay based on a difference between a sending time of the delay detection data packet and a receiving time of the delay response data packet. For example, at time T1, the vehicle diagnostic device sends a delay detection data packet A to the remote diagnostic server. Upon receiving the delay detection data packet A, the remote diagnostic server immediately returns a delay response data packet B to the vehicle diagnostic device. If the vehicle diagnostic device receives the delay response data packet B at time T2, the current transmission delay is (T2−T1)/2.

For the current network state, the vehicle diagnostic device can determine the network signal strength corresponding to the current network of the vehicle diagnostic device as the current network state.

For the current load capacity, the vehicle diagnostic device can determine the current concurrency value of the remote diagnostic server in the delay response data packet (i.e., the number of various requests, such as remote diagnostic requests, that the remote diagnostic server can simultaneously process) as the current load capacity.

The current transmission delay, the current network state, and the current load capacity can be obtained sequentially or in parallel; the present disclosure imposes no specific limitations.

Further, in the embodiments of the present disclosure, after the vehicle diagnostic device obtains the current transmission delay, the current network state, and the current load capacity and determines a current transmission delay level corresponding to the current transmission delay, a current network state level corresponding to the current network state, and a current load capacity level, corresponding to the current load capacity. The following methods can be used but are not limited to.

For the current transmission delay level, the vehicle diagnostic device can determine the current transmission delay level corresponding to the current transmission delay based on a preset corresponding relationship between the transmission delay and the transmission delay level. The transmission delay level can be divided based on a set number of levels and a delay level division base, where the higher the transmission delay, the lower the transmission delay level. For example, the delay level division base is 50 ms, and there are 10 transmission delay levels. The transmission delay levels from high to low can include transmission delay level one 0~50 ms, transmission delay level two 50~100 ms, transmission delay level three 100~150 ms, transmission delay level four 150~200 ms, transmission delay level five 200~250 ms, transmission delay level six 250~300 ms, transmission delay level seven 300~350 ms, transmission delay level eight 350-400 ms, transmission delay level nine 400~450 ms, and the transmission delay level ten 450~500 ms; assuming that the current transmission delay is 320 ms, the current transmission delay level is transmission delay level seven 300-350 ms.

For the current network state level, the vehicle diagnostic device can determine the current network state level corresponding to the current network state based on a preset corresponding relationship between the network state and the network state level. The network state level can be divided based on a set number of levels and a network level division base, where the better the network state, the higher the network state level. For example, if the network level division base is 50 dBm and there are 10 network state levels, the network state levels from high to low can include network state level one −50~0 dBm, network state level two −50~−100 dBm, network state level three −100~−150 dBm, network state level four −150~−200 dBm, network state level five −200~−250 dBm, network state level six −250~−300 dBm, network state level seven −300~−350 dBm, network state level eight −350~−400 dBm, network state level nine −400~−450 dBm, and network state level ten −450~−500 dBm; and assuming that the current network state is −30 dBm, the current network state level is network state level one −50~0 dBm.

For the current load capacity level, the vehicle diagnostic device can determine the current load capacity level corresponding to the current load capacity based on a preset corresponding relationship between the load capacity and the load capacity level. The load capacity level can be divided based on a set number of levels and a load level division base. For example, the load level division base comprises 50 concurrent requests and the load capacity level is 10. The load capacity levels from high to low can include load capacity level one 450-500, load capacity level two 400-450, load capacity level three 350-400, load capacity level four 300-350, load capacity level five 250-300, load capacity level six 200-250, load capacity level seven 150-200, load capacity level eight 100-150, load capacity level nine 50-100, and load capacity level ten 0-50; and assuming the current load capacity is 420, the current load capacity level is load capacity level two 400-450.

The current transmission delay level, the current network state level, and the current load capacity level can be determined sequentially or in parallel; the present disclosure imposes no specific limitations.

Step 402: obtaining a current transmission delay weight corresponding to the current transmission delay, a current network state weight corresponding to the current network state, and the current load capacity weight corresponding to the current load capacity.

In a specific implementation, when the vehicle diagnostic device obtains the current transmission delay, the current network state, and the current load capacity, it can adopt but is not limited to the following methods.

Firstly, the vehicle diagnostic device obtains a current position distance between the vehicle diagnostic device and the remote diagnostic server and determines the transmission delay weight corresponding to the current position distance as the current transmission delay weight based on a corresponding relationship between a position distance and the transmission delay weight. The farther the position distance is, the greater the impact of transmission delay and the greater the transmission delay weight. For example, assuming that the transmission delay weight corresponding to a position distance of 0-50 km is 0.1, the transmission delay weight corresponding to a position distance of 50-100 km is 0.2, the transmission delay weight corresponding to a position distance of 100-150 km is 0.3, . . . , and the transmission delay weight corresponding to a position distance of 300-350 km is 0.7, so that when the current position distance is 320 km, the current transmission delay weight is 0.7.

Then, the vehicle diagnostic device divides a remaining weight after removing the current transmission delay weight based on a weight ratio between the current network state and the current load capacity to obtain the current network state weight and the current load capacity weight, where the weight ratio can be a fixed value, such as a weight ratio of 2:1. For example, assuming that the current transmission delay weight is 0.7 and the weight ratio between the current network state and the current load capacity is 2:1, then the current network state weight is $$(1-0.7)*\frac{2}{3}=0.2,$$

and the current load capacity weight is $$(1-0.7)*\frac{1}{3}=0.1.$$

Step 403: determining the current congestion value based on the current transmission delay level and the current transmission delay weight, the current network state level and the current network state weight, and the current load capacity level and the current load capacity weight.

In a specific implementation, when the vehicle diagnostic device determines the current congestion value based on the current transmission delay level and the current transmission delay weight, the current network state level and the current network state weight, and the current load capacity level and the current load capacity weight, the following methods can be used but are not limited to.

First, the vehicle diagnostic device determines the current transmission delay quantization coefficient corresponding to the current transmission delay level, the current network state quantization coefficient corresponding to the current network state level, and the current load capacity quantization coefficient corresponding to the current load capacity level.

The current transmission delay quantization coefficient corresponding to the current transmission delay level is determined based on the number of delay level division bases contained in the maximum transmission delay corresponding to the current transmission delay level. For example, assuming that the delay level division base is 50 ms and the transmission delay level is 10, then the transmission delay quantization coefficient corresponding to transmission delay level one 0-50 ms is 0.1, the transmission delay quantization coefficient corresponding to transmission delay level two 50-100 ms is 0.2, the transmission delay quantization coefficient corresponding to transmission delay level three 100-150 ms is 0.3, the transmission delay quantization coefficient corresponding to transmission delay level four 150-200 ms is 0.4, . . . , and the transmission delay quantization coefficient corresponding to transmission delay level ten 450-500 ms is 1.

The current network state quantization coefficient corresponding to the current network state level is determined based on the number of network level division bases contained in the maximum network signal strength corresponding to the current network state level. For example, assuming that the network level division base is 50 dBm and the network state level is 10, then the network state quantization coefficient corresponding to network state level one −50-0 dBm is 0.1, the network state quantization coefficient corresponding to network state level two −50-100 dBm is 0.2, the network state quantization coefficient corresponding to network state level three −100~−150 dBm is 0.3, the network state quantization coefficient corresponding to network state level four −150~−200 dBm is 0.4, . . . , and the network state quantization coefficient corresponding to network state level ten −450~−500 dBm is 1.

The current load capacity quantization coefficient corresponding to the current load capacity level is determined based on the number of load level division bases contained in the maximum concurrency corresponding to the current load capacity level. For example, assuming that the load level division base is 50 and the load capacity level is 10, then the load capacity quantization coefficient corresponding to load capacity level one 450-500 is 0.1, the load capacity quantization coefficient corresponding to load capacity level two 400-450 is 0.2, the load capacity quantization coefficient corresponding to load capacity level three 350-400 is 0.3, the load capacity quantization coefficient corresponding to load capacity level four 300-350 is 0.4, . . . , and the load capacity quantization coefficient corresponding to load capacity level ten 0-50 is 1.

Then, the vehicle diagnostic device determines the current congestion value based on the current transmission delay quantization coefficient and the current transmission delay weight, the current network state quantization coefficient and the current network state weight, and the current load capacity quantization coefficient and the current load capacity weight. Specifically, the vehicle diagnostic device can determine the current congestion value using the following formula:

$$C\text{ congestion} = Q\text{ delay}\times L\text{ delay} + Q\text{ network}\times L\text{ netowork} + Q\text{ load}\times L\text{ load},$$

where C congestion represents the current congestion value, with a value range of (0, 1); Q delay represents the current transmission delay weight (e.g., 0.7); L delay represents the current transmission delay quantization coefficient; Q network represents the current network state weight (e.g., 0.1); L network represents the current network state quantization coefficient; Q load represents the current load capacity weight (e.g., 0.2); and L load represents the current load capacity quantization coefficient.

Step 404: determining the target transmission rate based on the current congestion value.

In a specific implementation, after obtaining the current maximum receiving rate of the remote diagnostic server, the vehicle diagnostic device can determine the product of the current congestion value and the current maximum receiving rate as the target transmission rate. For example, if the current congestion value is 0.5 and the current maximum receiving rate of the remote diagnostic server is 100 data packets per second, the target transmission rate would be 0.5*100=50 data packets per second. The current maximum receiving rate of the remote diagnostic server can be sent by the remote diagnostic server to the vehicle diagnostic device when the vehicle diagnostic device establishes a UDT communication connection with the remote diagnostic server. It can also be obtained by the vehicle diagnostic device by sending a rate acquisition request to the remote diagnostic server or determined by the vehicle diagnostic device based on the bandwidth of the remote diagnostic server. The specific acquisition method is not limited to the present disclosure.

It is worth noting that, in the embodiments of the present disclosure, in order to further ensure data transmission efficiency, the vehicle diagnostic device can dynamically adjust the current congestion value within each flow control cycle. Specifically, when the vehicle diagnostic device determines that the current network state changes, it dynamically adjusts the current transmission delay weight, the current network state weight, and the current load capacity weight based on the changed network state. It further dynamically adjusts the current congestion value based on the dynamically adjusted current transmission delay weight, current network state weight, and current load capacity weight; and/or, when determining that the current position distance changes, it dynamically adjusts the current transmission delay weight, current network state weight, and current load capacity weight based on the changed position distance, and dynamically adjusts the current congestion value based on the dynamically adjusted current transmission delay weight, current network state weight, and current load capacity weight. The adjustment method for the weights and congestion value is similar to the aforementioned method for determining the weights and congestion value, and repeated details are omitted.

Notably, in the embodiments of the present disclosure, to further improve data transmission efficiency, when the vehicle diagnostic device determines the target transmission rate based on the current congestion value, it can also determine a target congestion window (CWnd) based on the current congestion value. Furthermore, it performs flow control during the data transmission process based on the target CWnd and the target transmission rate to further enhance data transmission efficiency. Specifically, if it is determined that the current congestion value is less than a preset threshold, a first adjustment algorithm (e.g., an exponential adjustment algorithm, a multiplication adjustment algorithm, etc.) is employed to adjust the current CWnd to obtain the target CWnd. If it is determined that the current congestion value is not less than the preset threshold, a second adjustment algorithm (e.g., an additive adjustment algorithm, a subtraction adjustment algorithm, etc.) is employed to adjust the current CWnd to obtain the target CWnd. The adjustment magnitude of the first adjustment algorithm is greater than the adjustment magnitude of the second adjustment algorithm. Thus, when network conditions are favorable, the first adjustment algorithm with a larger adjustment magnitude is used to substantially adjust the current CWnd, thereby rapidly increasing the number of UDT data packets transmitted consecutively. When network conditions are unfavorable, the second adjustment algorithm with a smaller adjustment magnitude is used to adjust the current CWnd slightly, which can make full use of network bandwidth as much as possible and further improve the data transmission rate. Of course, if, during the adjustment of the current CWnd using the first adjustment algorithm, it is determined that a data packet is lost for the first time, it is determined that the size of the current CWnd has increased to the maximum value. In this case, the adjustment of the current CWnd using the first adjustment algorithm can be stopped, and the second adjustment algorithm can be used to adjust the current CWnd.

Figure 5:
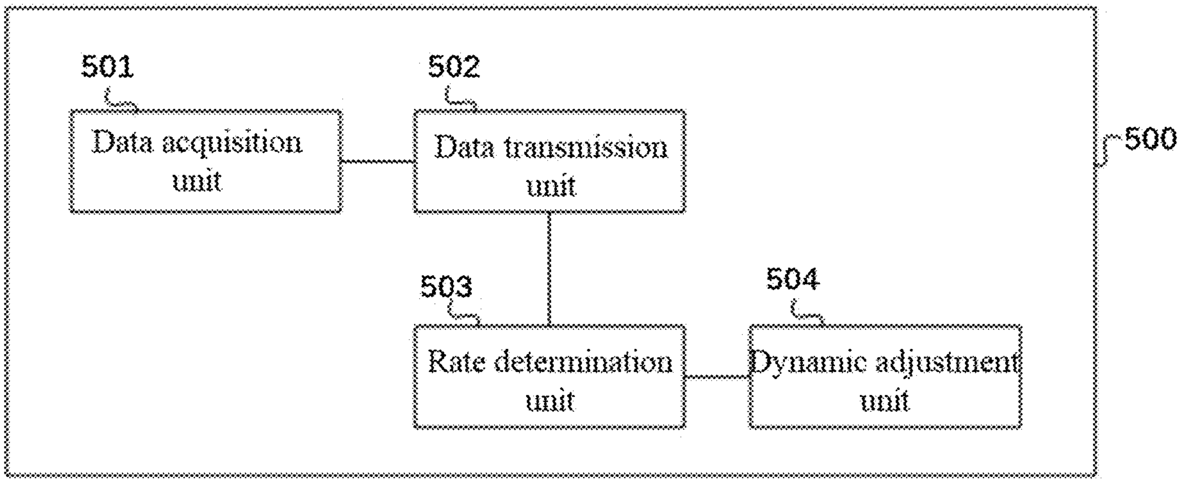
FIG. 5 is a schematic diagram of a functional structure of a data transmission apparatus in an embodiment of the present disclosure.

Based on the above embodiments, the present disclosure also provides a data transmission apparatus, applied to a vehicle diagnostic device, where the vehicle diagnostic device establishes a communication connection with a remote diagnostic server through UDT. The vehicle diagnostic device can be the first vehicle diagnostic device and the second vehicle diagnostic device in the data transmission system shown in FIG. 1. As shown in FIG. 5, the data transmission apparatus 500 provided by the embodiment of the present disclosure at least includes:

a data acquisition unit 501, configured for obtaining data to be transmitted of the target vehicle, wherein the data to be transmitted comprises the vehicle monitoring data of the target vehicle or the vehicle diagnostic result of the target vehicle and the vehicle maintenance plan corresponding to the vehicle diagnostic result;

a data transmission unit 502, configured for encapsulating the data to be transmitted of the target vehicle into a UDT data packet; and sending the UDT data packet at a target transmission rate corresponding to a current congestion value, wherein the current congestion value is determined based on a current transmission delay between the vehicle diagnostic device and the remote diagnostic server, a current network state of the vehicle diagnostic device, and a current load capacity of the remote diagnostic server.

In one possible embodiment, the data transmission apparatus 500 provided by the embodiment of the present disclosure further includes:

a rate determination unit 503, configured for obtaining the current transmission delay, the current network state, and the current load capacity; determining a current transmission delay level corresponding to the current transmission delay, a current network state level corresponding to the current network state, and a current load capacity level corresponding to the current load capacity; obtaining a current transmission delay weight corresponding to the current transmission delay, a current network state weight corresponding to the current network state, and the current load capacity weight corresponding to the current load capacity; determining the current congestion value based on the current transmission delay level and the current transmission delay weight, the current network state level and the current network state weight, and the current load capacity level and the current load capacity weight; and determining the target transmission rate based on the current congestion value.

In one possible embodiment, when obtaining the current transmission delay, the current network state, and the current load capacity, the rate determination unit 503 is specifically configured for:

sending a delay detection data packet to the remote diagnostic server; receiving a delay response data packet returned by the remote diagnostic server based on the delay detection data packet; determining the current transmission delay based on a difference between a sending time of the delay detection data packet and a receiving time of the delay response data packet;

determining a current network of the vehicle diagnostic device as the current network state; and determining a current concurrency value of the remote diagnostic server in the delay response data packet as the current load capacity.

In one possible embodiment, when obtaining a current transmission delay weight corresponding to the current transmission delay, a current network state weight corresponding to the current network state, and the current load capacity weight corresponding to the current load capacity, the rate determination unit 503 is specifically configured for:

obtaining a current position distance between the vehicle diagnostic device and the remote diagnostic server; determining the transmission delay weight corresponding to the current position distance as the current transmission delay weight based on a corresponding relationship between a position distance and the transmission delay weight; and dividing a remaining weight after removing the current transmission delay weight based on a weight ratio between the current network state and the current load capacity to obtain the current network state weight and the current load capacity weight.

In one possible embodiment, the data transmission apparatus 500 provided by the embodiment of the present disclosure further includes:

a dynamic adjustment unit 504, configured for dynamically adjusting the current transmission delay weight, the current network state weight, and the current load capacity weight based on the changed current network state when the current network state changes; and/or dynamically adjusting the current transmission delay weight, the current network state weight, and the current load capacity weight based on the changed current position distance when the current position distance changes.

In one possible embodiment, when determining the target transmission rate based on the current congestion value, the rate determination unit 503 is specifically configured for:

obtaining a current maximum receiving rate of the remote diagnostic server, and determining a product of the current congestion value and the current maximum receiving rate as a target transmission rate.

In one possible embodiment, when encapsulating the data to be transmitted of the target vehicle into a UDT data packet, the data transmission unit 502 is specifically configured for:

encrypting the data to be transmitted of the target vehicle based on a set encryption algorithm to obtain encrypted data and encapsulating the encrypted data into the UDT data packet.

In one possible embodiment, when encrypting the data to be transmitted of the target vehicle based on the set encryption algorithm to obtain encrypted data, the data transmission unit 502 is specifically configured for:

encrypting the data to be transmitted of the target vehicle based on the AES encryption algorithm to obtain encrypted data.

It should be noted that the principle by which the data transmission apparatus 500 provided in the embodiments of the present disclosure solves technical problems is similar to that of the data transmission method provided in the embodiments of the present disclosure. Therefore, the implementation of the data transmission apparatus 500 provided in the embodiments of the present disclosure can refer to the implementation of the data transmission method provided in the embodiments of the present disclosure, and repeated details are omitted.

After introducing the data transmission system, method, and apparatus provided in the embodiments of the present disclosure, the vehicle diagnostic device provided in the embodiments of the present disclosure will be briefly described.

Figure 6:
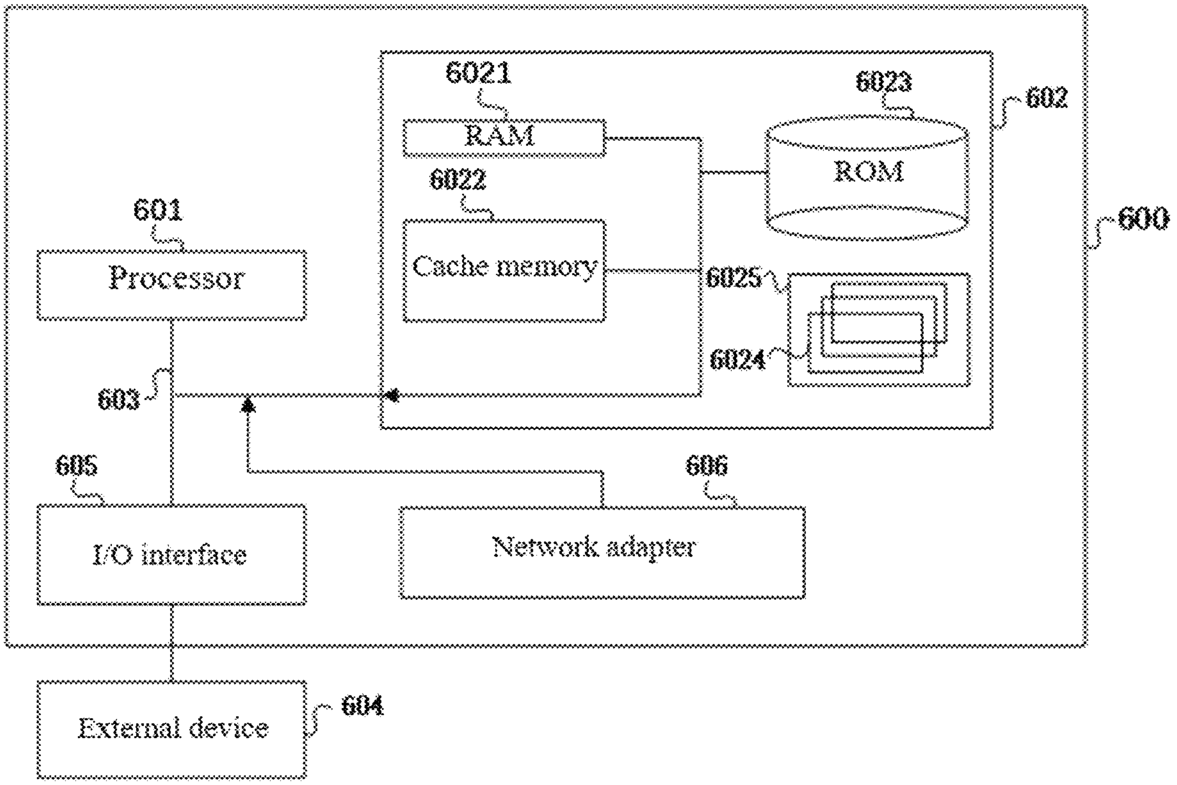
FIG. 6 is a schematic diagram of a hardware structure of a vehicle diagnostic device in an embodiment of the present disclosure.

The vehicle diagnostic device provided in the embodiments of the present disclosure can be the first vehicle diagnostic device and second vehicle diagnostic device in the data transmission system shown in FIG. 1. Referring to FIG. 6, the vehicle diagnostic device 600 provided in the embodiments of the present disclosure at least includes: a processor 601, a memory 602, and a computer program stored in the memory 602 and executable on the processor 601. The processor 601, when executing the computer program, implements the data transmission method provided by the embodiment of the present disclosure.

The vehicle diagnostic device 600 provided in the embodiments of the present disclosure can further include a bus 603 connecting different components, including the processor 601 and the memory 602. The bus 603 represents one or more types of bus structures, including a memory bus, peripheral bus, local bus, etc.

The memory 602 can include a volatile memory as a readable storage medium, such as random access memory (RAM) 6021 and/or cache memory 6022. It can also further include read-only memory (ROM) 6023. The memory 602 can also include a program tool 6025 with a set of (at least one) program modules 6024. The program modules 6024 include, but are not limited to, an operating subsystem, one or more applications, other program modules, and program data. Each of these examples or a combination thereof can include the implementation of a network environment.

The processor 601 can be a single processing element or a collective term for multiple processing elements. For example, the processor 601 can be a central processing unit (CPU) or one or more integrated circuits configured to implement the data transmission method provided in the embodiments of the present disclosure. Specifically, the processor 601 can be a general-purpose processor, including but not limited to a CPU, an application specific integrated circuit (ASIC), a field programmable gate array (FPGA), or other programmable logic devices, discrete gate or transistor logic devices, discrete hardware components, etc.

The vehicle diagnostic device 600 can communicate with one or more external devices 604 (such as keyboards, remote controls, etc.) and can also communicate with one or more devices that allow users to interact with the vehicle diagnostic device 600 (e.g., mobile phones, computers, etc.), and/or with any devices that enable the vehicle diagnostic device 600 to communicate with one or more other vehicle diagnostic devices 600 (e.g., routers, modems, etc.). The communication can be carried out via an Input/Output (I/O) interface 605. Additionally, the vehicle diagnostic device 600 can communicate with one or more networks (e.g., local area network (LAN), wide area network (WAN), and/or public networks such as the Internet) through a network adapter 606. As shown in FIG. 6, the network adapter 606 communicates with other modules of the vehicle diagnostic device 600 through the bus 603. It should be understood that, although not shown in FIG. 6, other hardware and/or software modules can be used in combination with the vehicle diagnostic device 600, including but not limited to microcode, device drivers, redundant processors, external disk drive arrays, redundant arrays of independent disks (RAID) subsystems, tape drives, and data backup storage subsystems, among others.

It should be noted that the vehicle diagnostic device 600 shown in FIG. 6 is merely an example and should not impose any limitations on the functionality and scope of use of the embodiments of the present disclosure.

The following introduces the computer-readable storage medium provided in the embodiments of the present disclosure. The computer-readable storage medium, provided by the embodiments of the present disclosure, stores the computer programs. The computer instructions, when executed by a processor, implement the data transmission method provided by the embodiment of the present disclosure. Specifically, the computer instructions can be embedded or installed in the processor, which enables the processor to implement the data transmission method provided by the embodiments of the present disclosure by executing the embedded or installed computer instructions.

Moreover, the data transmission method provided in the embodiments of the present disclosure can also be implemented as a computer program product. The computer program product includes program code, wherein the program code, when executed on a processor, implements the data transmission method provided by the embodiments of the present disclosure.

The computer program product provided in the embodiments of the present disclosure can use one or more computer-readable storage media. The computer-readable storage medium can be, but is not limited to, an electrical, magnetic, optical, electromagnetic, infrared, or semiconductor system, device, or apparatus, or any suitable combination thereof. Specifically, more detailed examples (non-exhaustive list) of computer-readable storage media include: electrical connections with one or more wires, portable disks, hard drives, RAM, ROM, erasable programmable read only memory (EPROM), optical fibers, portable compact disc read-only memory (CD-ROM), optical storage devices, magnetic storage devices, or any suitable combination of the above.

The computer program product provided in the embodiments of the present disclosure can utilize a CD-ROM containing the program code and can also run on a vehicle diagnostic device. However, the computer program product provided in the embodiments of the present disclosure is not limited to this. In the embodiments of the present disclosure, a computer-readable storage medium can be any tangible medium that contains or stores program code, and the program code can be used by or in conjunction with an instruction execution system, device, or apparatus.

It should be noted that although several units or sub-units of the apparatus are mentioned in the detailed description above, such division is merely illustrative and not mandatory. In practice, according to the embodiments of the present disclosure, the features and functions of two or more units described above may be implemented in a single unit. Conversely, the features and functions of a single unit described above may be further divided and implemented across multiple units.

Additionally, although the operations of the method of the present disclosure are described in a specific order in the drawings, it is not required or implied that these operations must be performed in this specific order or that all operations shown must be executed to achieve the desired result. Additionally, or alternatively, certain steps may be omitted, multiple steps may be combined into one step for execution, and/or one step may be divided into multiple steps for execution.

Although preferred embodiments of the present disclosure have been described, once those skilled in the art become aware of the basic inventive concept, they may make additional changes and modifications to these embodiments. Therefore, the appended claims are intended to be construed to include not only the preferred embodiments but also all changes and modifications falling within the scope of the present disclosure.

Clearly, those skilled in the art can make various alterations and modifications to the embodiments of the present disclosure without departing from the spirit and scope of the embodiments of the present disclosure. Thus, if these modifications and variations of the embodiments of the present disclosure fall within the scope of the claims and equivalent technologies, the present disclosure is also intended to include these modifications and variations.

The invention claimed is:

1. A data transmission system, comprising:

a first vehicle diagnostic device, a second vehicle diagnostic device, and a remote diagnostic server, wherein the first vehicle diagnostic device and the second vehicle diagnostic device each comprise a processor, and each respectively establish communication connections with the remote diagnostic server through a user datagram protocol-based data transfer protocol (UDT);

the first vehicle diagnostic device is configured for collecting vehicle monitoring data of a target vehicle; encapsulating the vehicle monitoring data of the target vehicle into a first UDT data packet; sending the first UDT data packet at a first target transmission rate corresponding to a first current congestion value, wherein the first current congestion value is determined based on a first current transmission delay between the first vehicle diagnostic device and the remote diagnostic server, a first current network state of the first vehicle diagnostic device, and a first current load capacity of the remote diagnostic server;

receiving a second UDT data packet returned by the second vehicle diagnostic device based on the first UDT data packet, which is forwarded by the remote diagnostic server; and performing a vehicle maintenance operation on the target vehicle based on a vehicle diagnostic result of the target vehicle in the second UDT data packet and a vehicle maintenance plan corresponding to the vehicle diagnostic result;

the remote diagnostic server is configured for receiving the first UDT data packet sent by the first vehicle diagnostic device and forwarding the first UDT data packet to the second vehicle diagnostic device; and receiving the second UDT data packet returned by the second vehicle diagnostic device and forwarding the second UDT data packet to the first vehicle diagnostic device;

the second vehicle diagnostic device is configured for receiving the first UDT data packet forwarded by the remote diagnostic server; determining the vehicle diagnostic result of the target vehicle and the vehicle maintenance plan corresponding to the vehicle diagnostic result based on the vehicle monitoring data of the target vehicle in the first UDT data packet; encapsulating the vehicle diagnostic result of the target vehicle and the vehicle maintenance plan corresponding to the vehicle diagnostic result into the second UDT data packet; sending the second UDT data packet at a second target transmission rate corresponding to a second current congestion value, wherein the second current congestion value is determined based on a second current transmission delay between the second vehicle diagnostic device and the remote diagnostic server, a second current network state of the second vehicle diagnostic device, and a second current load capacity of the remote diagnostic server; and wherein the first vehicle diagnostic device performs vehicle maintenance operations on the target vehicle based on the received vehicle diagnostic result of the target vehicle and the vehicle maintenance plan corresponding to the vehicle diagnostic result.

2. The data transmission system according to claim 1, wherein the first vehicle diagnostic device is further configured for obtaining the first current transmission delay, the first current network state, and the first current load capacity; determining a first current transmission delay level corresponding to the first current transmission delay, a first current network state level corresponding to the first current network state, and a first current load capacity level corresponding to the first current load capacity; obtaining a first current transmission delay weight corresponding to the first current transmission delay, a first current network state weight corresponding to the first current network state, and a first current load capacity weight corresponding to the first current load capacity; determining the first current congestion value based on the first current transmission delay level and the first current transmission delay weight, the first current network state level and the first current network state weight, and the first current load capacity level and the first current load capacity weight; and determining the first target transmission rate based on the determined first current congestion value; and the second vehicle diagnostic device is further configured for obtaining the second current transmission delay, the second current network state, and the second current load capacity; determining a second current transmission delay level corresponding to the second current transmission delay, a second current network state level corresponding to the second current network state, and a second current load capacity level corresponding to the second current load capacity; obtaining a second current transmission delay weight corresponding to the second current transmission delay, a second current network state weight corresponding to the second current network state, and the second current load capacity weight corresponding to the second current load capacity; determining the second current congestion value based on the second current transmission delay level and the second current transmission delay weight, the second current network state level and the second current network state weight, and the second current load capacity level and the second current load capacity weight; and determining the second target transmission rate based on the second current congestion value.

3. The data transmission system according to claim 2, wherein the first vehicle diagnostic device is configured for sending a first delay detection data packet to the remote diagnostic server; receiving a first delay response data packet returned by the remote diagnostic server based on the first delay detection data packet; determining the first current transmission delay based on a difference between a sending time of the first delay detection data packet and a receiving time of the first delay response data packet; determining a current network of the first vehicle diagnostic device as the first current network state; and determining a current concurrency value of the remote diagnostic server in the first delay response data packet as the first current load capacity; and the second vehicle diagnostic device is configured for sending a second delay detection data packet to the remote diagnostic server; receiving a second delay response data packet returned by the remote diagnostic server based on the second delay detection data packet; determining the second current transmission delay based on a difference between a sending time of the second delay detection data packet and a receiving time of the second delay response data packet; determining a current network of the second vehicle diagnostic device as the second current network state; and determining a current concurrency value of the remote diagnostic server in the second delay response data packet as the second current load capacity.

4. The data transmission system according to claim 3, wherein the first vehicle diagnostic device is configured for encrypting the vehicle monitoring data of the target vehicle based on an advanced encryption standard (AES) encryption algorithm to obtain a first encrypted data and encapsulating the first encrypted data into the first UDT data packet; and the second vehicle diagnostic device is configured for encrypting the vehicle diagnostic result of the target vehicle and the vehicle maintenance plan corresponding to the vehicle diagnostic result based on the AES encryption algorithm to obtain a second encrypted data and encapsulating the second encrypted data into the second UDT data packet.

5. The data transmission system according to claim 2, wherein the first vehicle diagnostic device is configured for obtaining a first current position distance between the first vehicle diagnostic device and the remote diagnostic server; determining a transmission delay weight corresponding to the first current position distance as the first current transmission delay weight based on a corresponding relationship between the position distance and the transmission delay weight; and dividing a remaining weight after removing the first current transmission delay weight based on a weight ratio between the first current network state and the first current load capacity to obtain the first current network state weight and the first current load capacity weight; and the second vehicle diagnostic device is configured for obtaining a second current position distance between the second vehicle diagnostic device and the remote diagnostic server; determining a transmission delay weight corresponding to the second current position distance as the second current transmission delay weight based on a corresponding relationship between the position distance and the transmission delay weight; and dividing a remaining weight after removing the second current transmission delay weight based on a weight ratio between the second current network state and the second current load capacity to obtain the second current network state weight and the second current load capacity weight.

6. The data transmission system according to claim 5, wherein the first vehicle diagnostic device is further configured for dynamically adjusting the first current transmission delay weight, the first current network state weight, and the first current load capacity weight based on a changed first current network state when the first current network state changes; and/or dynamically adjusting the first current transmission delay weight, the first current network state weight, and the first current load capacity weight based on a changed first current position distance when the first current position distance changes; and the second vehicle diagnostic device is further configured for dynamically adjusting the second current transmission delay weight, the second current network state weight, and the second current load capacity weight based on a changed second current network state when the second current network state changes; and/or dynamically adjusting the second current transmission delay weight, the second current network state weight, and the second current load capacity weight based on a changed second current position distance when the second current position distance changes.

7. The data transmission system according to claim 6, wherein the first vehicle diagnostic device is configured for encrypting the vehicle monitoring data of the target vehicle based on an advanced encryption standard (AES) encryption algorithm to obtain a first encrypted data and encapsulating the first encrypted data into the first UDT data packet; and the second vehicle diagnostic device is configured for encrypting the vehicle diagnostic result of the target vehicle and the vehicle maintenance plan corresponding to the vehicle diagnostic result based on the AES encryption algorithm to obtain a second encrypted data and encapsulating the second encrypted data into the second UDT data packet.

8. The data transmission system according to claim 5, wherein the first vehicle diagnostic device is configured for encrypting the vehicle monitoring data of the target vehicle based on an advanced encryption standard (AES) encryption algorithm to obtain a first encrypted data and encapsulating the first encrypted data into the first UDT data packet; and the second vehicle diagnostic device is configured for encrypting the vehicle diagnostic result of the target vehicle and the vehicle maintenance plan corresponding to the vehicle diagnostic result based on the AES encryption algorithm to obtain a second encrypted data and encapsulating the second encrypted data into the second UDT data packet.

9. The data transmission system according to claim 2, wherein the first vehicle diagnostic device is configured for encrypting the vehicle monitoring data of the target vehicle based on an advanced encryption standard (AES) encryption algorithm to obtain a first encrypted data and encapsulating the first encrypted data into the first UDT data packet; and the second vehicle diagnostic device is configured for encrypting the vehicle diagnostic result of the target vehicle and the vehicle maintenance plan corresponding to the vehicle diagnostic result based on the AES encryption algorithm to obtain a second encrypted data and encapsulating the second encrypted data into the second UDT data packet.

10. The data transmission system according to claim 1, wherein the first vehicle diagnostic device is configured for encrypting the vehicle monitoring data of the target vehicle based on an advanced encryption standard (AES) encryption algorithm to obtain a first encrypted data and encapsulating the first encrypted data into the first UDT data packet; and the second vehicle diagnostic device is configured for encrypting the vehicle diagnostic result of the target vehicle and the vehicle maintenance plan corresponding to the vehicle diagnostic result based on the AES encryption algorithm to obtain a second encrypted data and encapsulating the second encrypted data into the second UDT data packet.

* * * * *